(12) United States Patent
Wang et al.

(10) Patent No.: US 12,482,301 B2
(45) Date of Patent: *Nov. 25, 2025

(54) COMPONENT MAINTENANCE PREDICTION SYSTEM WITH BEHAVIOR MODELING

(71) Applicant: The Boeing Company, Chicago, IL (US)

(72) Inventors: Changzhou Wang, Bellevue, WA (US); Darren Puigh, Bellevue, WA (US); Darren Brian Macer, Seattle, WA (US); Jun Yuan, Sammamish, WA (US); Mark Mazarek, Bothell, WA (US); Lesley Quach, Seattle, WA (US)

(73) Assignee: The Boeing Company, Chicago, IL (US)

( * ) Notice: Subject to any disclaimer, the term of this patent is extended or adjusted under 35 U.S.C. 154(b) by 757 days.

This patent is subject to a terminal disclaimer.

(21) Appl. No.: 17/806,025

(22) Filed: Jun. 8, 2022

(65) Prior Publication Data
US 2023/0401899 A1 Dec. 14, 2023

(51) Int. Cl.
G07C 5/00 (2006.01)
G06F 18/214 (2023.01)
G06N 20/00 (2019.01)

(52) U.S. Cl.
CPC .......... *G07C 5/006* (2013.01); *G06F 18/214* (2023.01); *G07C 5/008* (2013.01); *G06N 20/00* (2019.01)

(58) Field of Classification Search
CPC ....... G07C 5/006; G07C 5/008; G06F 18/214; G06N 20/00
See application file for complete search history.

(56) References Cited

U.S. PATENT DOCUMENTS

2002/0133587 A1* 9/2002 Ensel .................. H04L 43/00
709/224
2014/0309846 A1* 10/2014 Howard ................ B64F 5/60
701/31.9
(Continued)

FOREIGN PATENT DOCUMENTS

EP 1189126 B1 6/2006
WO 2020217004 A1 10/2020

OTHER PUBLICATIONS

European Patent Office Extended Search Report, dated Oct. 9, 2023, regarding Application No. EP23171055.9, 9 pages.
(Continued)

*Primary Examiner* — Tarek Chbouki
(74) *Attorney, Agent, or Firm* — Yee & Associates, P.C.

(57) ABSTRACT

A method, apparatus, system for managing a maintenance for a component in a vehicle. Sensor data is received for the vehicle. Target parameters are predicted using behavior machine learning models trained using first training data to predict the target parameters for a normal behavior of the component operating in a tolerance, wherein the target parameters characterize behavior of the component. Prediction metrics are determined from predicted values for the target parameters predicted by behavior machine learning models and actual values for the target parameters. Whether the component will fall out of the tolerance after a time period is predicted using the prediction metrics and a maintenance machine learning model trained using second training data to predict whether the maintenance is needed for the component, wherein the second training data comprises historical prediction metrics determined for the target parameters.

21 Claims, 12 Drawing Sheets

(56) References Cited

U.S. PATENT DOCUMENTS

| | | | | |
|---|---|---|---|---|
| 2018/0247239 | A1* | 8/2018 | Horrell | G06N 5/046 |
| 2019/0156298 | A1* | 5/2019 | Ethington | G06Q 10/20 |
| 2019/0180527 | A1 | 6/2019 | Segal et al. | |
| 2020/0103894 | A1* | 4/2020 | Cella | G05B 23/0289 |
| 2021/0288493 | A1* | 9/2021 | Prasad | H02J 3/003 |
| 2021/0330914 | A1* | 10/2021 | Young | A61M 16/161 |
| 2022/0318667 | A1* | 10/2022 | Babu Balasubramani | G06N 20/00 |
| 2023/0014791 | A1* | 1/2023 | Tinnea | G01N 17/02 |

OTHER PUBLICATIONS

Lee et al., Aviation Environmental Design Tool (AEDT): Technical Manual, Version 3b, Volpe National Transportation System Center, Sep. 6, 2019, 468 pages.

Lopes et al., "Design of the Next Generation Aircraft Noise Prediction Program: ANOPP2," 17th AIAA/CEAS Aeroacoustics Conference (32nd AIAA Aeroacoustics Conference), Jun. 2011, 17 pages.

1 European Patent Office Communication, dated Jun. 4, 2025, regarding Application No. EP23171055.9, 4 pages.

\* cited by examiner

COMPONENT MAINTENANCE PREDICTION SYSTEM WITH BEHAVIOR MODELING

BACKGROUND INFORMATION

1. Field

The present disclosure relates generally to an improved aircraft management system and in particular, to implement predictive aircraft maintenance.

2. Background

Aircraft maintenance involves performing various operations on an aircraft to ensure continued desired operation of the aircraft or aircraft component. The operations can include inspection, replacement, reworking inconsistencies in components, or other operations that maintain compliance with airworthiness directives and maintenance standards.

Aircraft maintenance is often performed on a scheduled basis. In some cases, unscheduled aircraft maintenance can occur when a particular component no longer performs as desired. Unscheduled aircraft maintenance can be challenging depending on deployment location of an aircraft and the availability of spare components in different operational regions. Current maintenance systems rely on reactionary maintenance schedules for unscheduled maintenance. For example, aircraft such as rotorcraft may be essentially grounded while replacement components and repairs are requested, ordered, and then delivered to the location of the rotorcraft. This type of maintenance can increase the time that an aircraft is out of service.

Therefore, it would be desirable to have a method and apparatus that take into account at least some of the issues discussed above, as well as other possible issues. For example, it would be desirable to have a method and apparatus that overcome a technical problem with more accurately scheduling aircraft maintenance.

SUMMARY

An embodiment of the present disclosure provides a method for managing a maintenance for a component in a vehicle. Behavior machine learning models are trained using first training data to output predicted values for target parameters for a normal behavior of component operating in a tolerance. Each behavior machine learning model in the behavior machine learning models predicts a target parameter in the target parameters for the component. Historical prediction metrics are determined from the predicted values for the target parameters predicted by behavior machine learning models in response to receiving historical sensor data and actual values for the target parameters for the component. A maintenance machine learning model is trained using second training data to predict whether the maintenance is needed for the component, wherein the second training data comprises the historical prediction metrics determined for the target parameters, wherein the maintenance machine learning model outputs a prediction as to whether the component will become out of the tolerance after a time period. Whether the maintenance is needed for the component is determined using sensor data for the component, prediction metrics determined from the predicted values for the target parameters output by the behavior machine learning models and actual values for the target parameters, and the maintenance machine learning model.

Another embodiment of the present disclosure provides a method for managing a maintenance for a component in a vehicle. Sensor data is received for the vehicle. Target parameters are predicted using behavior machine learning models trained using first training data to predict the target parameters for a normal behavior of the component operating in a tolerance, wherein the target parameters characterize behavior of the component. Prediction metrics are determined from predicted values for the target parameters predicted by behavior machine learning models and actual values for the target parameters. Whether the component will fall out of the tolerance after a time period is predicted using the prediction metrics and a maintenance machine learning model trained using second training data to predict whether the maintenance is needed for the component, wherein the second training data comprises historical prediction metrics determined for the target parameters.

Yet an embodiment of the present disclosure provides a vehicle management system comprising a computer system and a maintenance manager in the computer system. The maintenance manager is configured to train behavior machine learning models using first training data to output predicted values for target parameters for a normal behavior of a component operating in a tolerance. Each behavior machine learning model in the behavior machine learning models predicts a target parameter in the target parameters for the component. The maintenance manager is configured to determine historical prediction metrics from the predicted values for the target parameters predicted by behavior machine learning models in response to receiving historical sensor data and actual values for the target parameters for the component. The maintenance manager is configured to train a maintenance machine learning model using second training data to predict whether a maintenance is needed for the component. The second training data comprises the historical prediction metrics determined for the target parameters, wherein the maintenance machine learning model outputs a prediction as to whether the component will become out of the tolerance after a time period. The maintenance manager is configured to determine whether maintenance is needed for the component using sensor data for the component, the prediction metrics determined from the predicted values for the target parameters output by the behavior machine learning models and the actual values for the target parameters, and the maintenance machine learning model.

In still another embodiment of the present disclosure provides a vehicle management system comprising a computer system and a maintenance manager in the computer system. The maintenance manager is configured to receive sensor data for the vehicle. The maintenance manager is configured to predict target parameters using behavior machine learning models trained using first training data to predict the target parameters for a normal behavior of a component operating in a tolerance. The target parameters characterize behavior of the component. The maintenance manager is configured to determine prediction metrics from predicted values for the target parameters predicted by behavior machine learning models and actual values for the target parameters. The maintenance manager is configured to predict whether the component will fall out of the tolerance after a time period using the prediction metrics and a maintenance machine learning model trained using second training data to predict whether the maintenance is needed for the component. The second training data comprises historical prediction metrics determined for the target parameters and actual values for the target parameters.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
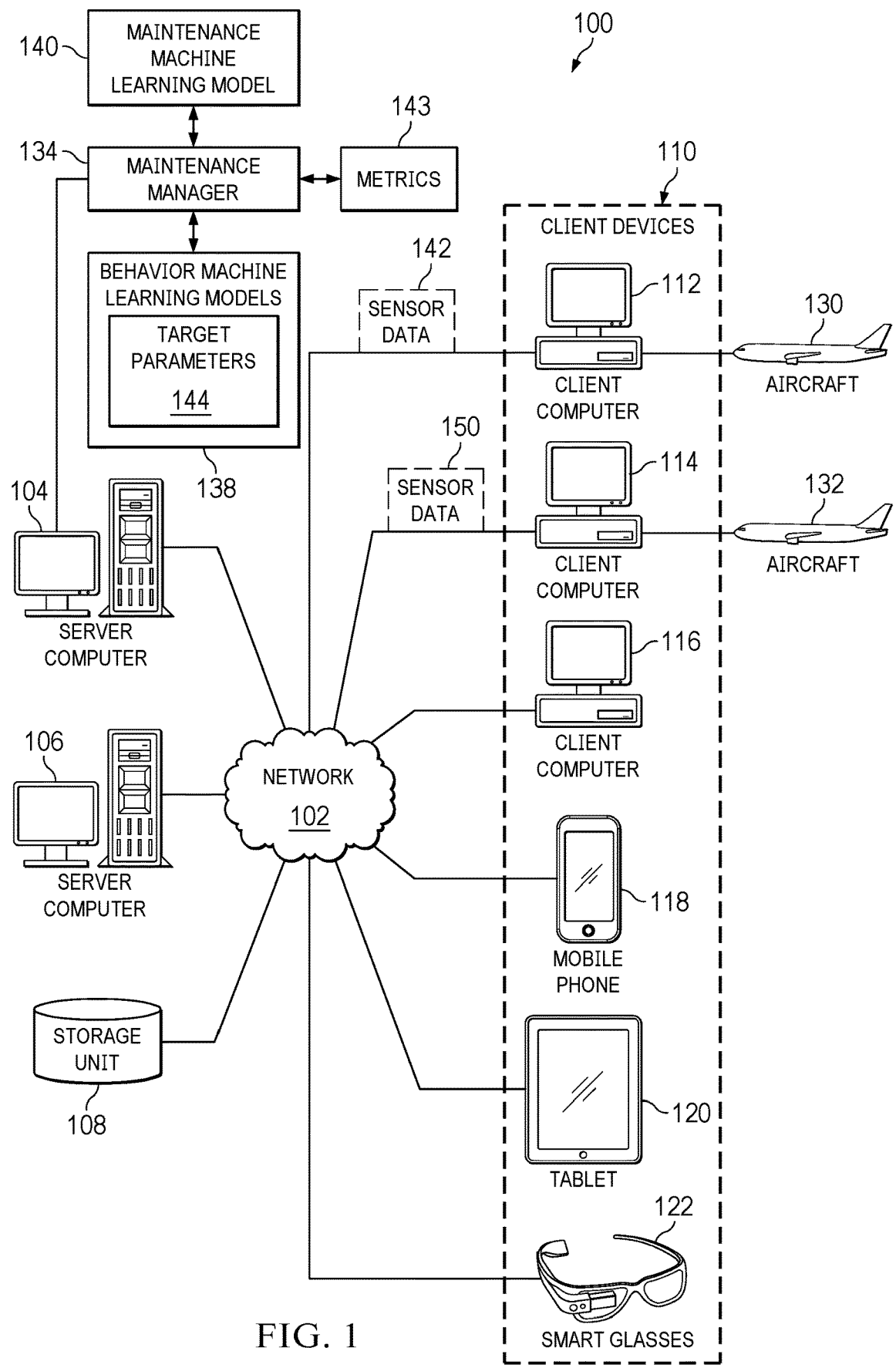
FIG. 1 is a pictorial representation of a network of data processing systems in which illustrative embodiments may be implemented.

The illustrative embodiments recognize and take into account one or more different considerations as described below. For example, the illustrative embodiments recognize and take into account that maintenance for aircraft or other platforms can be easier to manage having knowledge of impending changes in component performance that result in undesired aircraft performance. For example, the illustrative embodiments recognize and take into account that the undesired aircraft performance may be, for example, reduction in fuel efficiency, flight envelopes, maximum altitude, or aircraft speed.

Accurately knowing the remaining useful life (RUL) of the components enables procuring components ahead of time and enables the allocation of resources for service and repair. The illustrative embodiments recognize and take account that this knowledge can be especially useful when the availability of spare components may be difficult to obtain in different regions of the world.

The illustrative embodiments recognize and take into account that knowing when the component will no longer operate as desired is needed for planning the replacement of the component. This knowledge can provide increased lead times for allocating resources such as personnel, replacement components, or both personnel and replacement. Thus, illustrative embodiments recognize and take into account that accurately knowing when a component will no longer operate as desired can result in reducing the resource burden for maintaining aircraft. Further, schedule interruption of flights can be reduced or avoided such that delays for passengers and operation cost for crews and airports can be reduced or avoided.

Aircraft are equipped with numerous sensors that can record data about aircraft operations during, before, and after flights. This data can be analyzed to determine when maintenance may be needed. For example, an aircraft may have tens of thousands of sensors that can generate sensor data periodically such as once per second.

This data can be used to make predictions as to when components will no longer performs as desired. Further, each component can interact with many different components in an aircraft. The dynamics of component interaction can be fairly complex making it challenging to find simple formulas or decision rules from physical laws or experiments to make accurate assessments as to when maintenance is needed.

Additionally, current maintenance systems have difficulty predicting when a component replacement is needed with the amount of data generated by aircraft fleets. The amount of data can quickly overwhelm maintenance systems. For example, amount of data for a small aircraft fleet can be in petabytes. These systems can use engineers, service engineers, design engineers, and other subject matter experts (SMEs) to pare down the amount of data.

Further, this information used is based on the understanding that the human operators have for a particular system. Also, this type of selection of information for predictions can be time-consuming and subject to error.

For example, subject matter experts can miss helpful parameters used in predicting when a component needs maintenance. A subject matter expert may focus on a single system in which a component is located without paying attention to how other systems can impact the maintenance needs for the component. As result, data from these other systems may not be taken into account in the analysis for determining when maintenance is needed for the component.

In recognizing these and other considerations, illustrative examples provide a method, apparatus, system, and computer program product for predicting the state of components for aircraft. The illustrative examples can be applied to a fleet of aircraft and based on current and future conditions. The illustrative examples can predict maintenance needs based on initial assessment of features and sensor data parameters. The parameters used can be selected based on impact on the prediction. For example, parameters can be selected as those having the most impact on the prediction. Further, feature data can be selected temporarily and according to conditions. These conditions can be air temperature, air density, and other conditions. The prediction of when a component will no longer operate within a tolerance can be predicted using a subset of the sensor data based on time and conditions for operations.

With reference now to the figures and, in particular, with reference to FIG. 1, a pictorial representation of a network of data processing system is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In this illustrative example, client computer 112 is located in aircraft 130, and client computer 114 is located in aircraft 132. In this depicted example, other computers and data processing devices are present in aircraft 130 and aircraft 132 in addition to client computer 112 in aircraft 130 and client computer 114. In other illustrative examples, client computer 112 and client computer 114 can be located external to aircraft 130 in aircraft 132 but are in communication with these aircraft.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, maintenance manager 134 can predict when maintenance is needed for aircraft 130 and aircraft 132 using behavior machine learning models 138 and maintenance machine learning model 140. More specifically, maintenance manager 134 can use these machine learning models to predict when components in aircraft 130 and aircraft 132 will no longer function within a tolerance. In these illustrative examples, this prediction can be made for a future window of time in which the component will no longer operate within the tolerance.

This type of performance can be characterized as not operating within the tolerance. A component can be considered to be out of the tolerance when the component no longer works or functions, the performance of the component is not within a selected threshold, or the performance can be based on some other measurement.

This illustrative example, client computer 112 sends sensor data 142 from aircraft 130 to maintenance manager 134 over network 102. Sensor data 142 for aircraft 130 can comprise data generated periodically by aircraft 130. For example, data can be generated every second or at a rate of 1 Hz.

As depicted, maintenance manager 134 inputs sensor data 142 into behavior machine learning models 138. Behavior machine learning models 138 output predictions for target parameters 144 for a component in aircraft 130. In this illustrative example, each behavior machine learning model in behavior machine learning models 138 predicts a target parameter in target parameters 144 for the component.

The prediction of target parameters 144 is a process by maintenance manager 134 to generate metrics 143 for target parameters 144. Metrics 143 are input into maintenance machine learning model 140. In response, maintenance machine learning model 140 outputs a prediction as to whether maintenance will be needed for the component within a time window. This time window can be, for example, a period of one week beginning from the timestamp for sensor data 142.

As another example, client computer 114 can send sensor data 150 from aircraft 132 to maintenance manager 134. In this example, maintenance manager 134 can use behavior machine learning models 138 and maintenance machine learning model 140 to generate a prediction of whether a component in aircraft 132 will need maintenance within a time window. For example, the component can be of the same type or model as the component in aircraft 130.

In this example, the prediction for a component of the same type in aircraft 132 can be made using the same behavior machine learning models and maintenance machine learning model. In another example, additional behavior machine learning models and another maintenance machine learning model specifically trained for predicting maintenance for that component in aircraft 132 can be used.

When predictions are made for additional types of components, additional behavior machine learning models and maintenance machine learning models trained for those additional components can be used. In yet other illustrative examples, different machine learning models can be trained for the same type of component in different locations within the same aircraft.

Figure 2:
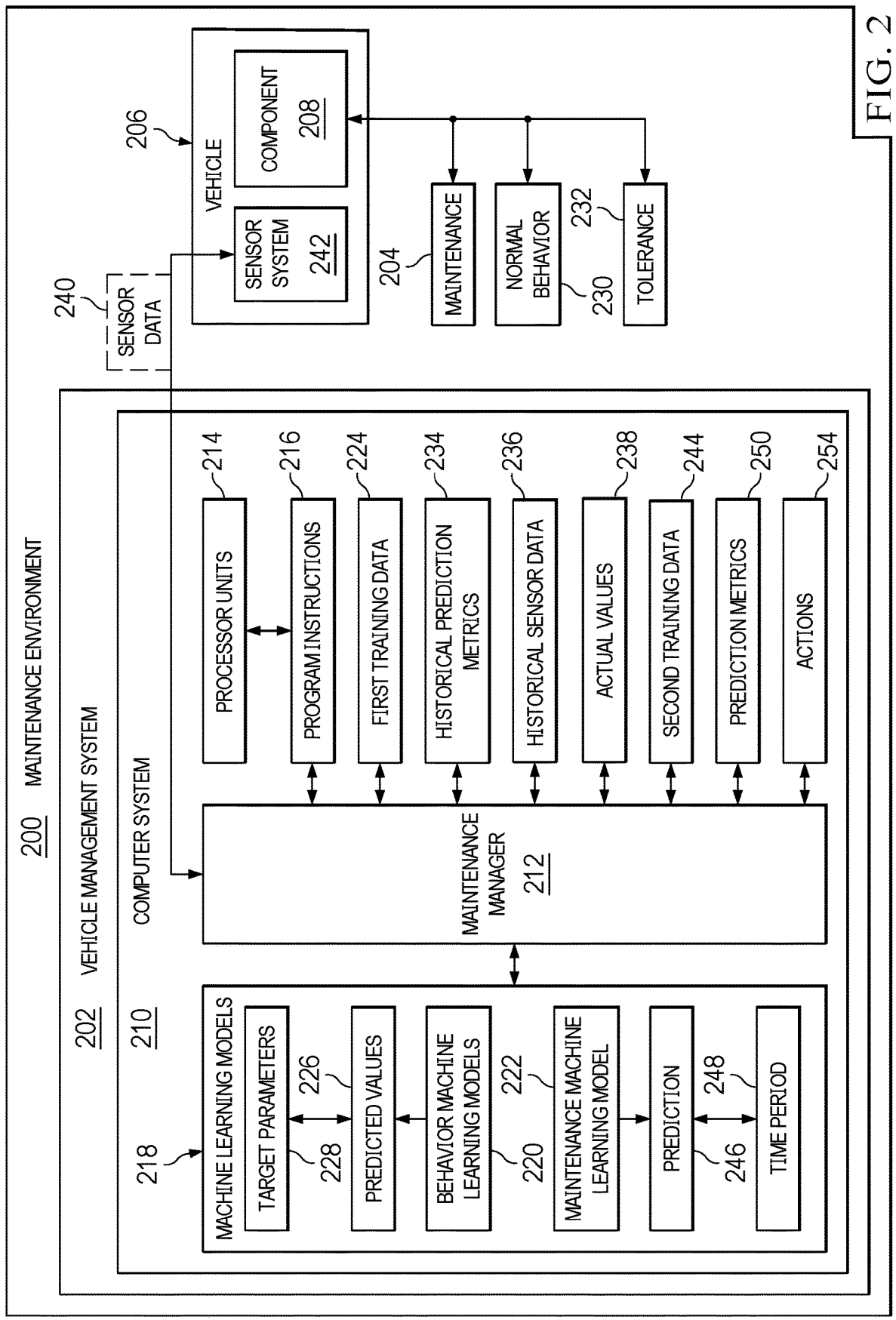
FIG. 2 is a block diagram of a maintenance environment in accordance with an illustrative embodiment.

With reference now to FIG. 2, a block diagram of a maintenance environment is depicted in accordance with an illustrative embodiment. In this illustrative example, maintenance environment 200 includes components that can be implemented in hardware such as the hardware shown in network data processing system 100 in FIG. 1.

In this illustrative example, vehicle management system 202 in maintenance environment 200 can operate to manage maintenance 204 for vehicle 206. Vehicle 206 can take a number of different forms. For example, vehicle 206 can be selected from a group comprising a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

For example, vehicle management system 202 can operate to predict maintenance 204 for component 208 in vehicle 206. Component 208 can take a number of different forms. For example, component 208 can be selected from a group comprising a door, a skin panel, a wiring harness, a faster, a fairing, an engine, and auxiliary power unit (APU), a fan, a bracket, a brace, a seal, a sensor, a window, a switch, a lever, a chair, a monument, or other suitable type of component used in vehicle 206.

As depicted, vehicle management system 202 comprises computer system 210 and maintenance manager 212. In this example, maintenance manager 212 is located in computer system 210.

Maintenance manager 212 can be implemented in software, hardware, firmware, or a combination thereof. When software is used, the operations performed by maintenance manager 212 can be implemented in program code configured to run on hardware, such as a processor unit. When firmware is used, the operations performed by maintenance manager 212 can be implemented in program code and data and stored in persistent memory to run on a processor unit. When hardware is employed, the hardware can include circuits that operate to perform the operations in maintenance manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program instructions 216 implementing processes in the illustrative examples. As used herein a processor unit in the number of processor units 214 is a hardware device and is comprised of hardware circuits such as those on an integrated circuit that respond and process instructions and program code that operate a computer. When a number of processor units 214 execute program instructions 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, in predicting whether maintenance 204 is needed, maintenance manager 212 can make this prediction using machine learning models 218. A machine learning model in machine learning models 218 is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms.

Machine learning models 218 can be implemented using various types of machine learning model architectures. Examples of machine learning models that can be used include an artificial neural network, a decision tree, a support vector machine, a linear regression machine learning model, a random forest learning model, a Bayesian network, a genetic algorithm, and other types of models.

These machine learning models can be trained using data and process additional data to provide a desired output.

As depicted, machine learning models 218 comprises behavior machine learning models 220 and maintenance machine learning model 222. In this illustrative example, behavior machine learning models 220 are trained to predict normal behavior of component 208. In one illustrative example, behavior machine learning models 220 can be implemented using regression machine learning models.

Maintenance machine learning model 222 is trained to determine when component 208 no longer operates as desired in vehicle 206. This undesired operation can be component 208 not operating at all or not operating with a desired performance level. Machine learning model 222 can also be implemented using a classification machine learning model.

In this illustrative example, the training of machine learning models 218 is performed in a manner that provides improved prediction of maintenance 204 for component 208 as compared to other techniques including those using machine learning models. In this illustrative example, the training is performed in two stages.

As depicted, maintenance manager 212 trains behavior machine learning models 220 using first training data 224 to output predicted values 226 for target parameters 228 for a normal behavior 230 of component 208 operating in tolerance 232. In the illustrative example, target parameters 228 are parameters that characterize behavior of component 208. If component 208 is an air compressor, target parameters 228 can be, for example, rotation speed, output temperature, pressure, air mass flow rate, and other parameters that characterize how the air compressor operates.

Other parameters may characterize the behavior other components for other systems in vehicle 206. In some cases, a target parameter can characterize the behavior of more than one component.

With the training, each behavior machine learning model in the behavior machine learning models 220 predicts a target parameter in the target parameters 228 for the component 208. In other words, each behavior machine learning model in behavior machine learning models 220 output a predicted value for a particular target parameter. As a result, each behavior machine learning model is trained for different target parameter in target parameters 228 from other behavior machine learning models.

After training of behavior machine learning models 220, maintenance manager 212 uses the machine learning models to generate second training data 244 for use in training maintenance machine learning model 222. In this illustrative example, maintenance manager 212 controls these machine learning models to output predicted values 226 for target parameters 228. Maintenance manager 212 determines historical prediction metrics 234 from predicted values 226 for target parameters 228 predicted by behavior machine learning models 220 using historical sensor data 236. This prediction is performed in response receiving historical sensor data 236 and actual values 238 for target parameters 228 for the component 208.

In this example, historical sensor data 236 comprises sensor data 240 previously received from sensor system 242 for vehicle 206. Sensor system 242 comprises sensors that detect information about components in vehicle 206 and the environment in and around vehicle 206.

In this illustrative example, predicted values 226 for target parameters 228 are generated using historical sensor data 236 for target parameters 228. Predicted values 226 for target parameters 228 are compared to actual values 238 in historical sensor data 236 for target parameters 228 to determine historical prediction metrics 234. In other words, historical prediction metrics 234 can describe statistics about predicted values 226 and actual values 238 for target parameters 228.

In this illustrative example, historical prediction metrics 234 form second training data 244. Maintenance manager 212 trains maintenance machine learning model 222 using second training data 244 to predict whether the maintenance is needed for the component. In this example, second training data 244 comprises historical prediction metrics 234 determined for target parameters 228. As trained, maintenance machine learning model 222 outputs prediction 246 that component 208 is becoming out of tolerance 232 after time period 248. In this illustrative example, prediction 246 can take a number of different forms. Prediction 246 can be in a form of a true or false statement. Further, the statement can also include a probability of the accuracy of the true or false statement.

Maintenance manager 212 can determine whether maintenance 204 is needed for component 208 using sensor data 240 for component 208, prediction metrics 250 determined from predicted values 226 for target parameters 228 outputted by behavior machine learning models 220 and actual values 238 for target parameters 228, and maintenance machine learning model 222.

Maintenance manager 212 can perform a set of actions 254 based on determining whether maintenance 204 is needed. The set of actions 254 can take a number of different forms. For example, the set of actions can be selected from at least one of scheduling maintenance 204, logging prediction 246, sending a notification to a maintenance facility, generating an alert, ordering a replacement component, or other suitable actions.

In one illustrative example, one or more technical solutions are present that overcome a technical problem with determining when maintenance is needed for components. As a result, one or more technical solutions can provide a technical effect using a configuration of machine learning models to more accurately determine whether a component will become out of a tolerance within a time period. This prediction can provide time to schedule maintenance prior to undesired performance of the components. This maintenance can include at least one of inspection, routine maintenance, part replacement, or other suitable type of maintenance.

Computer system 210 can be configured to perform at least one of the steps, operations, or actions described in the different illustrative examples using software, hardware, firmware, or a combination thereof. As a result, computer system 210 operates as a special purpose computer system in which maintenance manager 212 in computer system 210 enables more accurately predicting whether a component will no longer operate within tolerance 232 within a period of time. In particular, maintenance manager 212 transforms computer system 210 into a special purpose computer system as compared to currently available general computer systems that do not have maintenance manager 212.

In the illustrative example, the use of maintenance manager 212 in computer system 210 integrates processes into a practical application for a method of managing maintenance for a vehicle. Further, maintenance manager 212 using machine learning models 218 can predict whether component 208 will no longer operate within tolerance 232 in time period 248. With the amount of sensor data and analysis required, this type of prediction cannot be practically performed by a human operator in time to determine whether maintenance for a component in vehicle 206. Further, this type of analysis and prediction cannot be performed for the multitude of components in a vehicle and the number of vehicles that operator may have.

Figure 3:
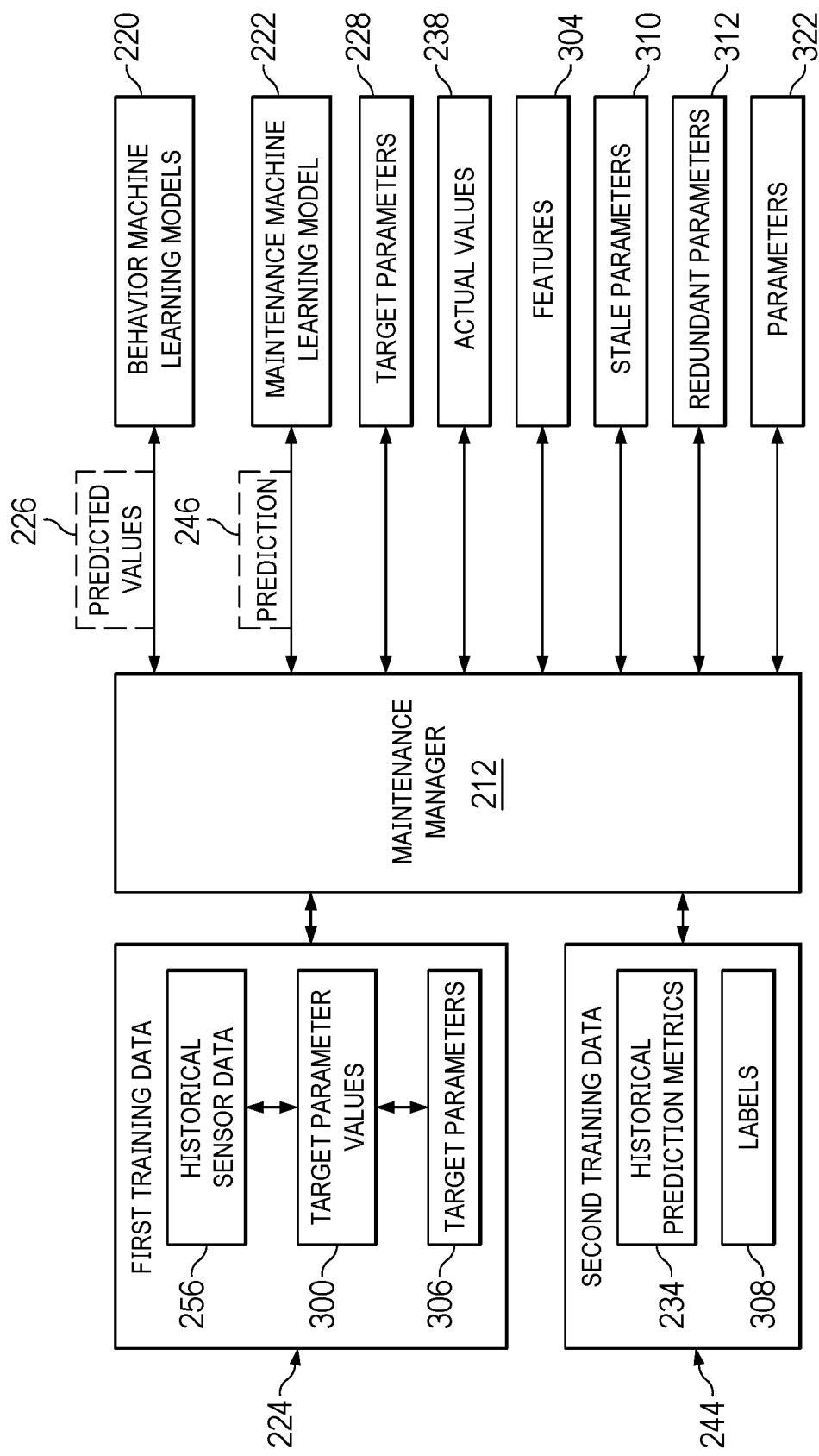
FIG. 3 is an illustration of a block diagram for training machine learning models in accordance with an illustrative embodiment.

With reference next to FIG. 3, an illustration of a block diagram for training machine learning models is depicted in accordance with an illustrative embodiment. In the illustrative examples, the same reference numeral may be used in more than one figure. This reuse of a reference numeral in different figures represents the same element in the different figures.

In the training process, maintenance manager 212 generates first training data 224 from historical sensor data 236. In this particular example, vehicle 206 is in the form of an aircraft.

In this illustrative example, maintenance manager 212 can select target parameters 228 from parameters 322. Parameters 322 are parameters for which sensor data 240 can be generated by sensor system 242.

Target parameters 228 are identified from parameters 322 as parameters that characterize the behavior of component 208. In identifying target parameters 228 from parameters 322, maintenance manager 212 can determine a correlation between parameters 322 and the behavior of component 208.

With an initial selection of target parameters 228, the number of target parameters can be reduced through a number of different operations. The reduction can be performed to reduce the amount of data and processing resources needed while maintaining a desired level of prediction made by behavior machine learning models 220.

For example, maintenance manager 212 can determine whether stale parameters 310 are present in target parameters 228. A stale parameter can describe the behavior of component 208 but never changes or does not change substantially during most flights. These stale parameters 310 can be removed from target parameters 228 in this example.

Further, in selecting target parameters 228, maintenance manager 212 can also identify redundant parameters 312 in target parameters 228. A redundant parameter is a parameter that is highly correlated to one or more other parameters. Target parameters 228 that are identified as redundant parameters 312 can be removed from target parameters 228.

In the illustrative example, temporal information can be represented in a number of different ways using parameters. For example, one approach involves repeating readings of parameters 322 for a given window at each sampling time. In other cases, temporal information for parameters 322 can be aggregated into features 304. Features 304 can be created from individual parameters and used with machine learning models that can combine correlated features correctly. In this manner, larger amount of data can be aggregated for training. As a result, first training data 224 can be based on at least one of parameters 322, target parameters 228, or features 304.

In yet another example, features 304 for behavior machine learning models 220 can be augmented others features from engineering hypotheses, such as summary statistics of the ambient conditions, behavior model target parameters, and selected key features over the whole flight or during different conditions. As another examples, features 304 can be augmented with time delay from control signals or key events to the desired conditions. For example, the time it takes for speed to spool down to zero or increase to target, or for pressure to stabilize.

Features 304 can capture temporal information with the modifications such as for maintenance prediction, future flights are not used unlike the future samples within the same flight for behavior modeling. Flight time is not uniformly distributed over time (unlike 1 Hz sampling of parameter values within the same flight). With this situation, wall clock time can be used as moving window size, or number of flights as moving window size. Missing flights, which happens more often than missing samples in a single flight, may create a problem for moving window calculations. If the number of missing flights in the window can be estimated, the missing flight can be a candidate feature in features 304.

Further features 304 can be separated into positions, for each position group, and others that are common to all positions. For example, if two cabin air compressors on each side of an aircraft, four positions are present. As a result, features can be identified for each of the four positions (L1, L2, R1, and R2), for each side (L1 and L2 vs. R1 and R2), for each number (L1 and R1 as inboard, L2 and R2 as outboard). To predict the maintenance for a specific position (e.g., Left Inboard or L1), features 304 specific to that position (L1), or to a position group containing that position (e.g., CAC Left, or CAC Inboard), can be used in addition to all common features. As a result, for each target position, G+1 prediction models may be present, where G is the number of position groups for each target position.

In one illustrative example, first training data 224 for a behavior machine learning model in the behavior machine learning models 220 comprises historical sensor data 236 that has been labeled with target parameter values 300 for target parameter 306 in target parameters 228 to be predicted by the behavior machine learning model, wherein each behavior machine learning model is trained to predict a different target parameter from other behavior machine learning models.

After behavior machine learning models 220 have been trained, these machine learning models can output predicted values 226 for target parameters 228. Each behavior machine learning model in behavior machine learning models 220 outputs a predicted value in predicted values 226 for the target parameter in target parameters for which the behavior machine learning model was trained.

In this illustrative example, historical sensor data 236 can be input into behavior machine learning models 220 to generate predicted values 226. Predicted values 226 can be used to generate second training data 244. In this illustrative example, maintenance manager 212 analyzes predicted values 226 for target parameters 228 with actual values 238 for target parameters 228. Actual values 238 can be obtained from historical sensor data 236.

As depicted, actual values 238 are not included from historical sensor data 236 used for first training data 224. In other words, actual values 238 are not included in first training data 224 for use for training behavior machine learning models 220.

This analysis can be performed to obtain historical prediction metrics 234. In this illustrative example, historical prediction metrics 234 are generated by comparing predicted values 226 to actual values 238. In other words, historical prediction metrics 234 can describe statistics about predicted values 226 and actual values 238 for target parameters 228.

These metrics can be determined for each testing flight and each target parameter. For example, historical prediction metrics 234 can be at least one of quantiles for the prediction error (true value−predicted value); quantiles for the absolute prediction error; root mean square error and mean absolute error; or goodness-of-fit, such as R2 score. These metrics can be calculated for an entire flight or phase of flight for an aircraft in this example.

In the illustrative example, prediction metrics can be calculated for the whole flight, a phase of flight, or for different conditions. For example, prediction metrics can be calculated for a single flight phase, such as taxi out or cruise and flight condition sub-segments, such as within initial climb and descent flight phases, where conditions change rapidly. As another example, prediction metrics can be calculated to an operation mode of component 208. Prediction metrics can be calculated for an operation condition of component 208. For example, altitude, pressure, and temperature can be combined into different conditions for component 208, such as a cabin air compressor. Prediction metrics can be calculated for control switch states, inlet, and outlet valve positions (in discrete bins), and auxiliary upstream and downstream fan speeds (in discrete bins).

Maintenance manager 212 creates second training data 244 using the addiction metrics. In this illustrative example, second training data 244 comprises historical prediction metrics 234 and labels 308, indicating whether component 208 was out of tolerance 232.

In this illustrative example, whether component 208 was out of tolerance 232 can be determined based on maintenance records. For example, if a component replacement occurs, sensor data sufficiently long (for example more than 1 month) before that date can be labeled as "normal" with the component being in in tolerance 232. The historical prediction metrics based on sensor data close and prior to the component replacement date, for example within 1 month, can be labeled as being "close to out of tolerance". In other illustrative examples, other types and numbers of labels can be used depending on the ability to analyze the historical sensor data 236 and maintenance records to determine the operating condition of component 208.

In this example, prediction 246 can be the amount of time until a next out of tolerance condition from the flight time. The time can be day, weeks, or some other time period.

Second training data 244 can be used to train maintenance machine learning model 222 to output prediction 246 that predicts whether component 208 will be in tolerance 232 or out of tolerance 232 after time period 248.

As result, the predictions using the behavior machine learning models 220 and maintenance machine learning model 222 can be for at least one of a phase of a flight, a taxi out, a takeoff, a climb, a cruise, a descent, a landing, an entire flight of the aircraft, a mode of operation of the aircraft, or a target range of control condition for the aircraft.

Figure 4:
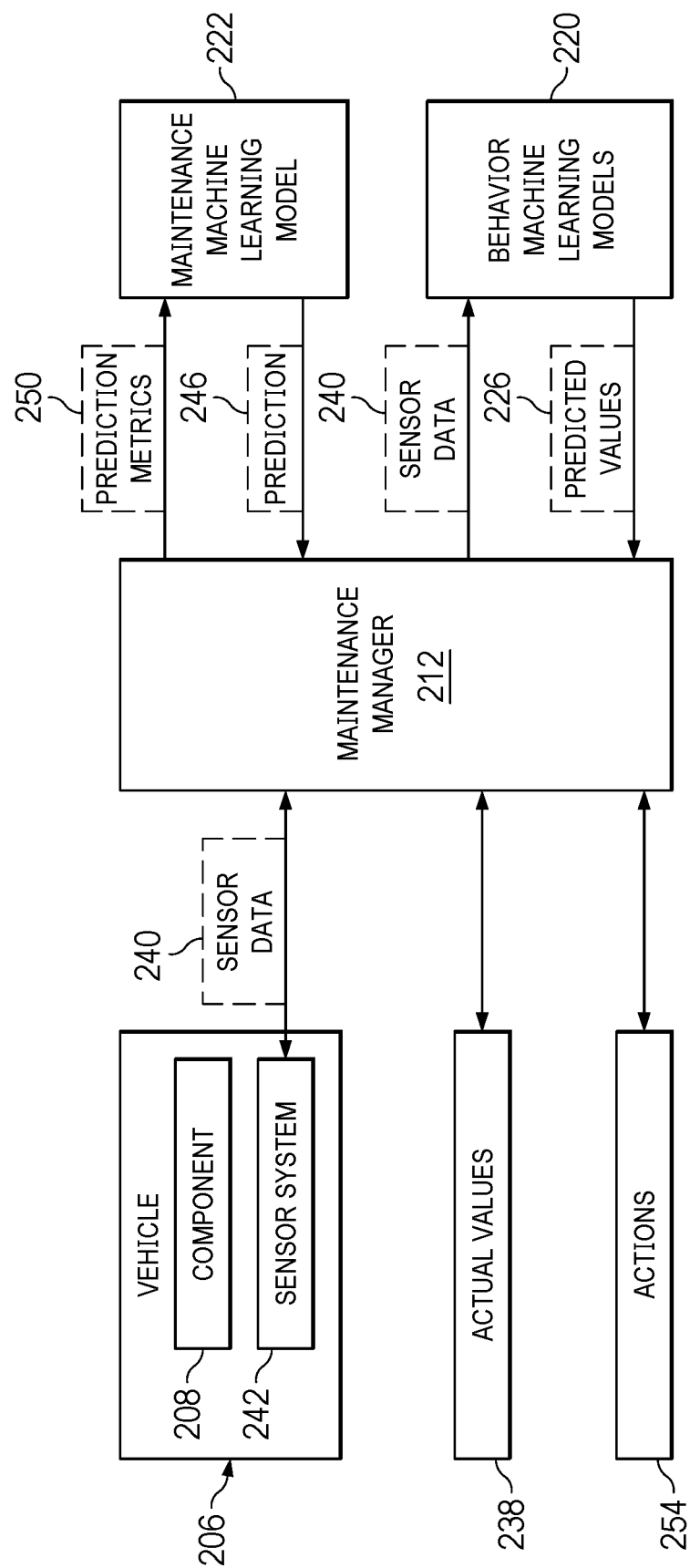
FIG. 4 is illustration of a block diagram for predicting whether maintenance is needed for a component in accordance with an illustrative embodiment.

With reference next to FIG. 4, illustration of a block diagram for predicting whether maintenance is needed for component is depicted in accordance with an illustrative embodiment. After training behavior machine learning models 220 and maintenance machine learning model 222, these machine learning models can now be used predict whether component 208 will be out of tolerance 232 after time period 248. With this prediction, component 208 should not be out of tolerance 232 prior to the expiration of time.

This type of prediction can be made with maintenance machine learning model 222 being implemented using a classification machine learning model that can be trained to predict another out of tolerance condition of component 208 within the next week, next month, next quarter, or some other time period.

In determining whether maintenance is needed for component 208, maintenance manager 212 receives sensor data 240 for component 208. This sensor data can be received from sensor system 242 as sensor data 240 is generated during flight or use of vehicle 206 or sensor data 240 can be received from sensor system 242 after the flight or use of vehicle 206.

In this illustrative example, maintenance manager 212 removes actual values 238 for target parameters 228 in sensor data 240 prior to sending sensor data 240 into behavior machine learning models 220. In other words, sensor data 240 sent into behavior machine learning models 220 does not include actual values 238 for target parameters 228.

Maintenance manager 212 sends sensor data 240 into behavior machine learning models 220. In response, maintenance manager 212 receives predicted values 226 for target parameters 228 from behavior machine learning models 220.

Maintenance manager 212 determines prediction metrics 250 from predicted values 226 for target parameters 228 output from behavior machine learning models 220 for sensor data 240 and actual values 238. This determination made by maintenance manager 212 can be performed by comparing actual values 238 to predicted values 226 for target parameters 228. In this example, prediction metrics 250 are generated for each target parameter.

With prediction metrics 250, maintenance manager 212 sends prediction metrics 250 into maintenance machine learning model 222. In response, maintenance manager 212 receives prediction 246 of whether maintenance is needed for component 208 as an output from maintenance machine learning model 222.

With prediction 246, maintenance manager 212 can perform a set of actions 254. The set of actions can be selected from at least one of scheduling maintenance 204, logging prediction 246, sending a notification to a maintenance facility, generating an alert, ordering a replacement component, or other suitable actions.

The illustration of maintenance environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although behavior machine learning models 220 and maintenance machine learning model 222 is described as being implemented using a classification machine learning model, other implementations can use other types of machine learning models.

As another example, maintenance manager 212 can be configured to perform predictions from multiple components within vehicle 206. Further, prediction 246 can be performed for component 208 in particular location. For example, prediction 246 can be for component 208 in the form of an aircraft engine on the right side of an aircraft. In this case, machine learning models 218 can be trained using sensor data 240 from engines on the right side of aircraft. Further, the training can be performed for a particular aircraft, fleet, or airline.

Figure 5:
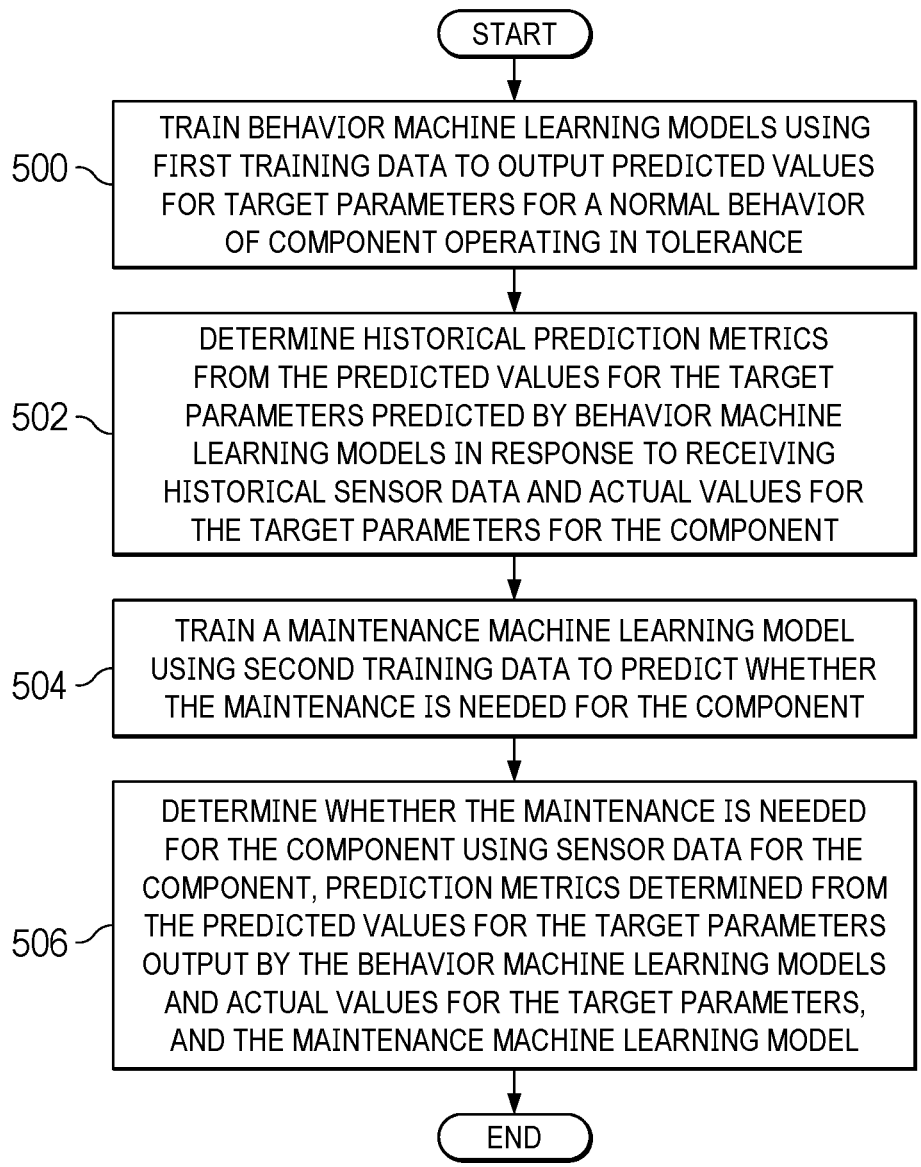
FIG. 5 is an illustration of a flowchart of a process for managing a maintenance for a component in a vehicle in accordance with an illustrative embodiment.

Turning next to FIG. 5, an illustration of a flowchart of a process for managing a maintenance for a component in a vehicle is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in maintenance manager 212 in computer system 210 in FIG. 2.

The process begins by training behavior machine learning models using first training data to output predicted values for target parameters for a normal behavior of component operating in tolerance (operation 500). In this operation, each behavior machine learning model in the behavior machine learning models predicts a target parameter in the target parameters for the component.

The process determines historical prediction metrics from the predicted values for the target parameters predicted by behavior machine learning models in response to receiving historical sensor data and actual values for the target parameters for the component (operation 502). The process trains a maintenance machine learning model using second training data to predict whether the maintenance is needed for the component (operation 504). In operation 504, the second training data comprises the historical prediction metrics determined for the target parameters. The maintenance machine learning model trained in operation 504, outputs a prediction as to whether the component will become out of tolerance after a time period.

The process determines whether the maintenance is needed for the component using sensor data for the component, prediction metrics determined from the predicted values for the target parameters output by the behavior machine learning models and actual values for the target parameters, and the maintenance machine learning model (operation 506). The process terminates thereafter.

Figure 6:
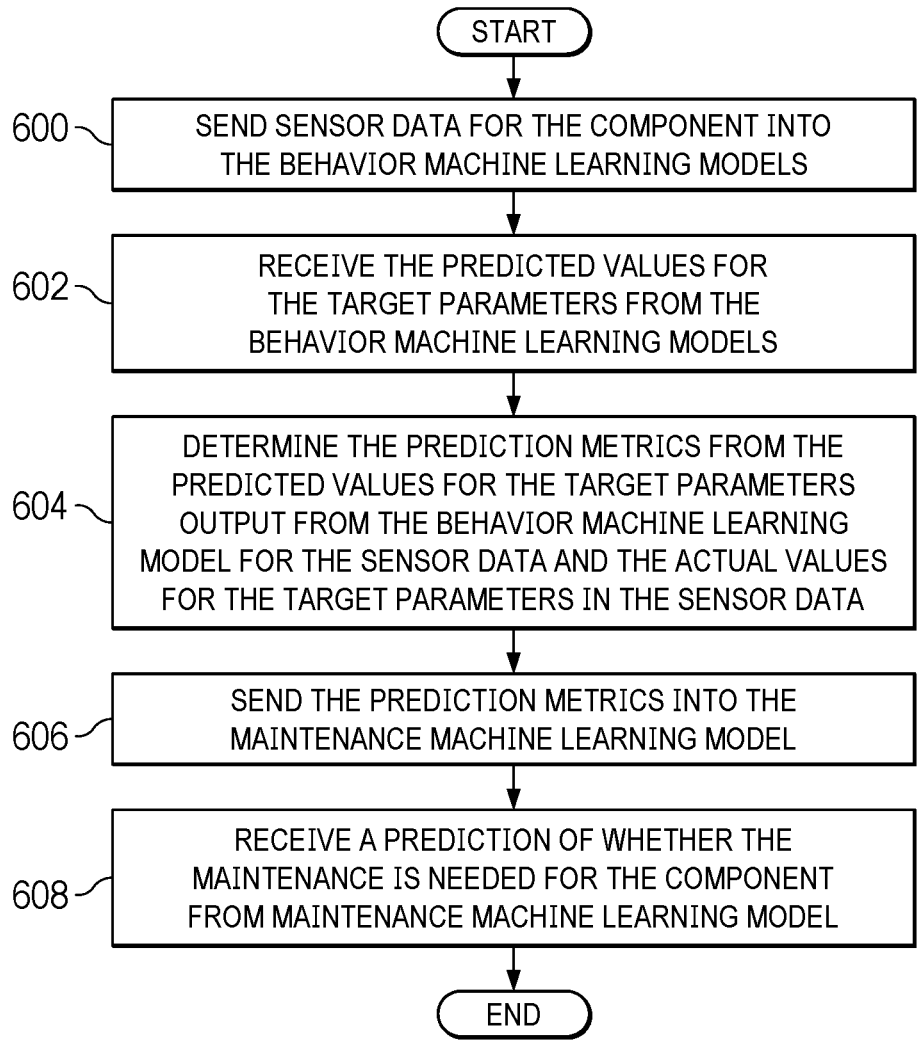
FIG. 6 is an illustration of a flowchart of a process for determining whether maintenance is needed for a component in accordance with an illustrative embodiment.

Turning next to FIG. 6, an illustration of a flowchart of a process for determining whether maintenance is needed for component is depicted in accordance with an illustrative embodiment. The operations in this flowchart are examples of an indication for operation 506 in FIG. 5.

The process begins by sending sensor data for the component into the behavior machine learning models (operation 600). The process receives the predicted values for the target parameters from the behavior machine learning models (operation 602). The process determines the prediction metrics from the predicted values for the target parameters output from the behavior machine learning model for the sensor data and the actual values for the target parameters in the sensor data (operation 604).

The process sends the prediction metrics into the maintenance machine learning model (operation 606). The process receives a prediction of whether the maintenance is needed for the component from maintenance machine learning model (operation 608). The process terminates thereafter.

Figure 7:
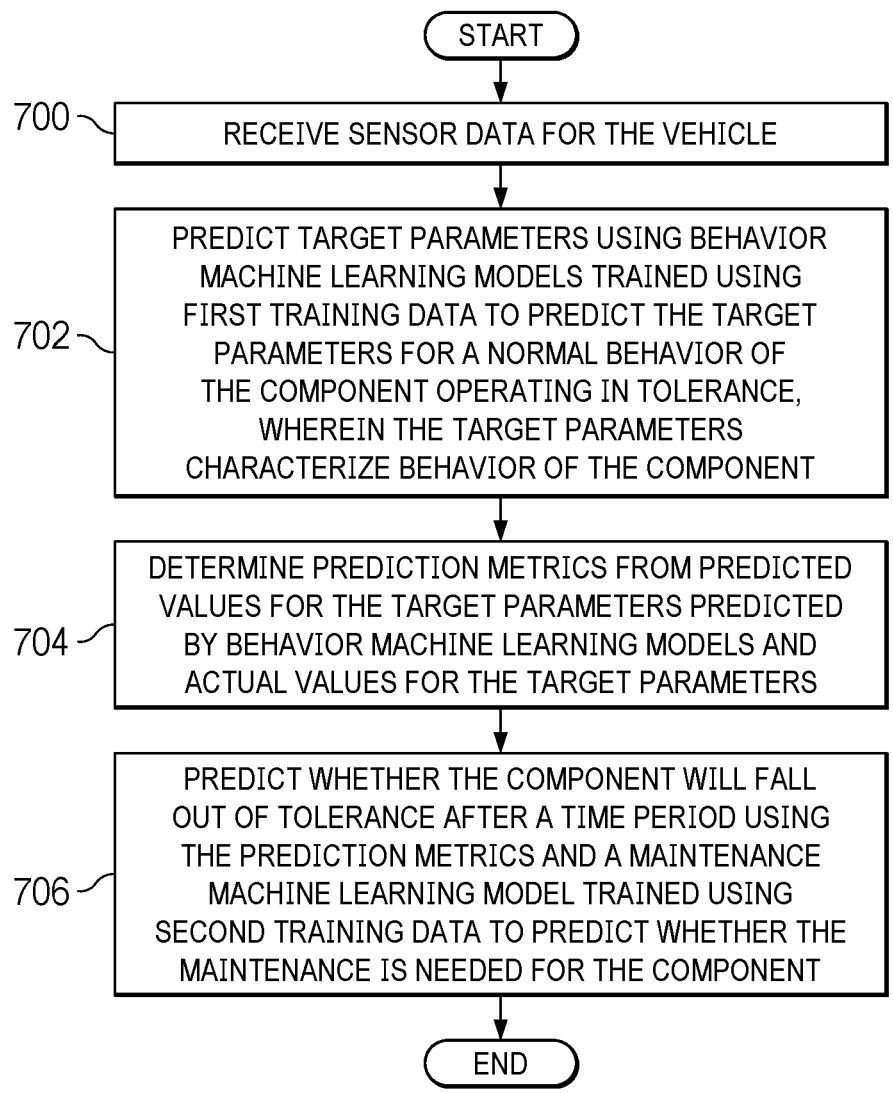
FIG. 7 is an illustration of a flowchart of a process for managing a maintenance for a component in a vehicle in accordance with an illustrative embodiment.

Turning next to FIG. 7, an illustration of a flowchart of a process for managing a maintenance for a component in a vehicle is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in maintenance manager 212 in computer system 210 in FIG. 2.

The process begins by receiving sensor data for the vehicle (operation 700). The process predicts target parameters using behavior machine learning models trained using first training data to predict the target parameters for a normal behavior of the component operating in tolerance, wherein the target parameters characterize behavior of the component (operation 702). The process determines prediction metrics from predicted values for the target parameters predicted by behavior machine learning models and actual values for the target parameters (operation 704).

The process predicts predicting whether the component will fall out of tolerance after a time period using the prediction metrics and a maintenance machine learning model trained using second training data to predict whether the maintenance is needed for the component (operation 706). The process terminates thereafter. The second training data used to train the maintenance learning machine model training data comprises historical prediction metrics determined for the target parameters.

Figure 8:
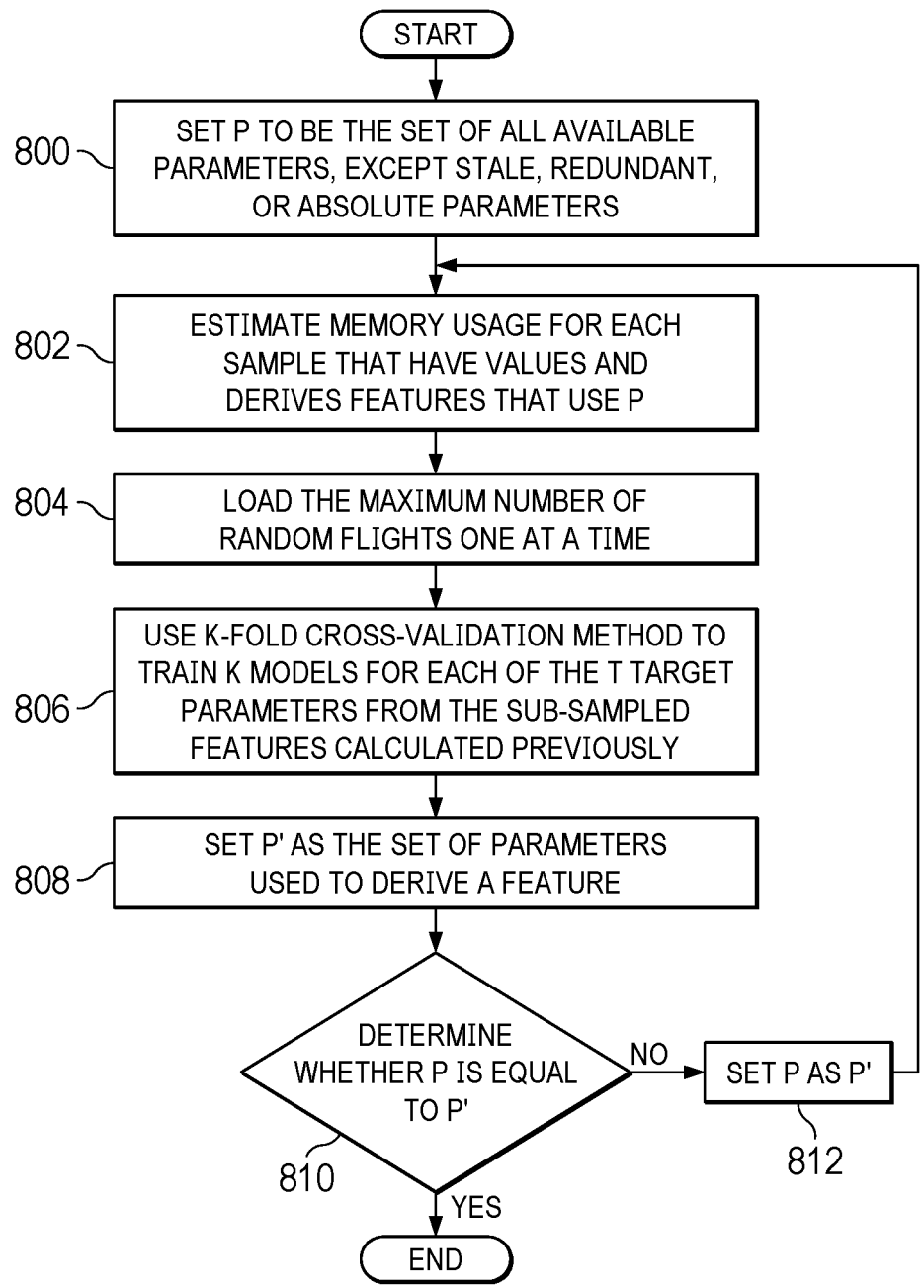
FIG. 8 is an illustration of a flowchart of process for selecting parameters in accordance with an illustrative embodiment.

Turning to FIG. 8, of a flowchart of process for selecting parameters is depicted in accordance with an illustrative embodiment. The process illustrated in this figure can be implemented in hardware, software, or both. When implemented in software, the process can take the form of program code that is run by one of more processor units located in one or more hardware devices in one or more computer systems. For example, the process can be implemented in maintenance manager 212 in computer system 210 in FIG. 2. Process can be used to select parameters for training behavior machine learning models to predict target parameters.

The process begins by setting P to be the set of set of all available parameters, except stale, redundant, or absolute time parameters (operation 800). The process estimates memory usage for each sample that have values and derives features that use P (operation 802). In operation 802, A sample is a value taken at a given time for a parameter. The sample can be a time-value pair. When many parameters are sampled and recorded at the same time, a sample can be the list of values for these parameters at a given time.

The process loads the maximum number of random flights one at a time (operation 804). In operation 804, features can be calculated, and subsamples of features can be identified using a sampling ratio ρ. The subsamples can be a randomly selected subset of the samples.

In this depicted example, in determining the maximum number of flights, memory is reserved for building and storing the model. For example, to use a Random Forest regression with 100 trees, the number of nodes for each tree may be limited to 100,000. This choice may result in the whole Random Forest regression model using about 12 GB memory. Operation 804 can be parallelized by partitioning the random flights and assigning each parallel task load a subset of the flights for processing.

The process uses K-fold cross-validation method to train K models for each of the T target parameters from the sub-sampled features calculated previously (operation 806). Operation 806 can be parallelized using a pool of K*T machine learning tasks. In this example, T is the target parameters multiplied by K, which is the folds. The folds are the number of groups that the data is to be split into. For each target parameter and each fold, a separate training task is used.

The process sets P' as the set of parameters used to derive a feature (operation 808). In operation 808, this set includes parameters in the list of top M1 features for any of the K models, parameters that appear in the list of top M2 features for all of the K models. The parameters in P' can also be parameters that have a feature importance of at least I1 for any of the K models and parameters that have feature importance of at least I2 for all of the K models. In this example, M1, M2, I1, and I2 are values hyperparameters in the machine learning models. For example, M2 can be 5, 10 or some other number of features. The values can be defined by a user or a meta-learning or hyper tuning process.

A determination is made as to whether P is equal to P' (operation 810). If P is not equal to P', the process sets P as P' (operation 812) and the process returns to operation 802. Otherwise, the process terminates.

During each iteration of the process in FIG. 8, as the number of parameters is reduced, the number of random flights can be increased so that the Random Forest regression model can be better generalized and less likely to overfit the training data. For example, using K=10, M1=50, M2=100, I1=0.01, I2=0.001, the process can select about 100 parameters from about 2000 recorded parameters for predicting target parameters for a component such as a cabin air compressor.

Figure 9:
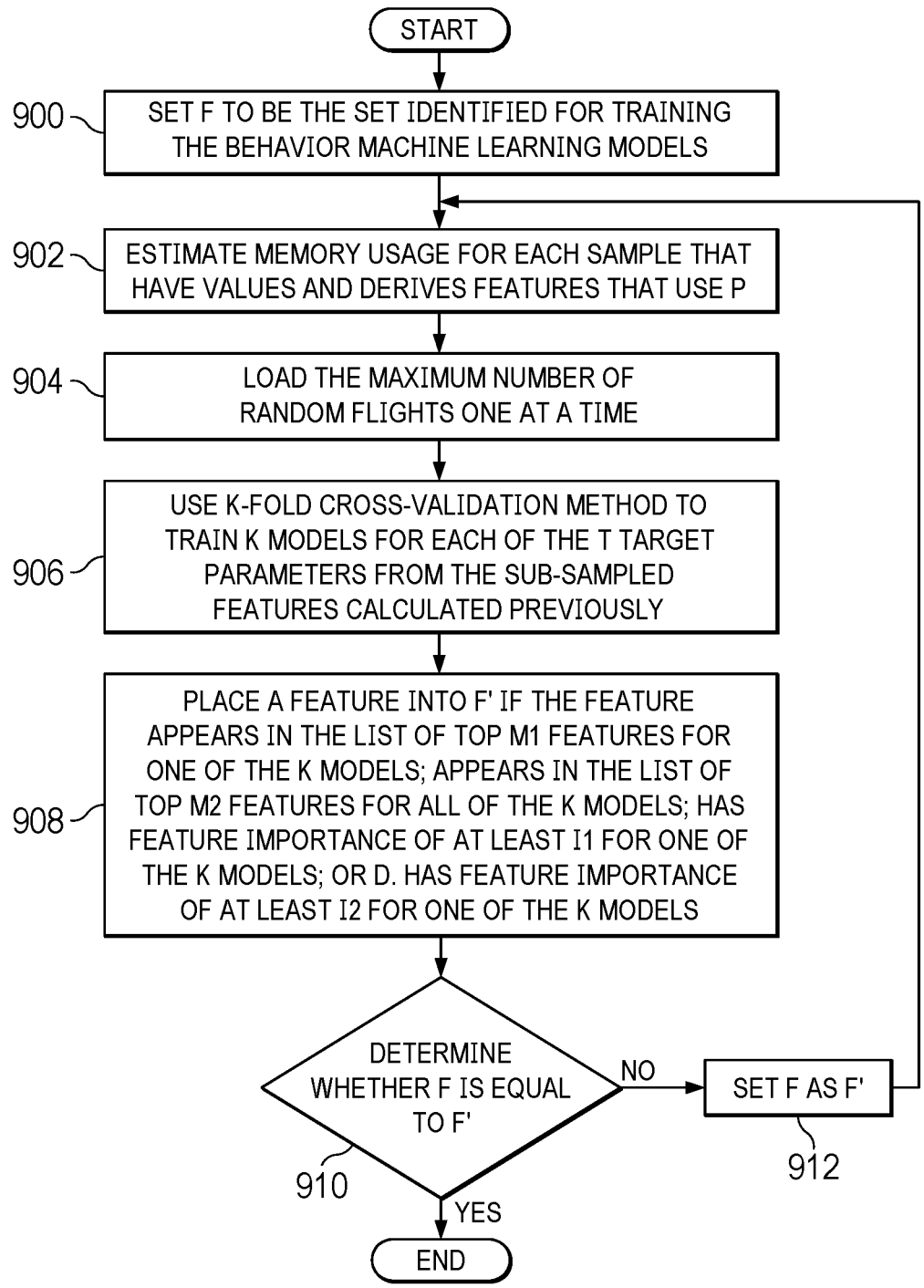
FIG. 9 is an illustration of a flowchart of process for selecting parameters in accordance with an illustrative embodiment.

Turning to FIG. 9, of a flowchart of process for selecting parameters is depicted in accordance with an illustrative embodiment. The process illustrated in this figure can be implemented in hardware, software, or both. When implemented in software, the process can take the form of program code that is run by one of more processor units located in one or more hardware devices in one or more computer systems. For example, the process can be implemented in maintenance manager 212 in computer system 210 in FIG. 2. Process can be used to select features for training behavior machine learning models such as Random Forest regression models.

The process begins by setting F to be the set of set of identified for training the behavior machine learning models (operation 900). The process estimates memory usage for each sample that have values and derives features that use P (operation 902).

The process loads the maximum number of random flights one at a time (operation 904). In operation 904, features can be calculated, and subsamples of features can be identified using a sampling ratio ρ. Operation 904 can be parallelized by partitioning the random flights and assigning each parallel task load a subset of the flights for processing.

The process uses K-fold cross-validation method to train K models for each of the T target parameters from the sub-sampled features calculated previously (operation 906). Operation 906 can be parallelized using a pool of K*T machine learning tasks.

The process places a feature into F' if the feature appears in the list of top M1 features for one of the K models; appears in the list of top M2 features for all of the K models; has feature importance of at least I1 for one of the K models; or has feature importance of at least I2 for one of the K models (operation 908).

A determination is made as to whether F is equal to F' (operation 910). If F is not equal to F', the process sets F as F' (operation 912) and the process returns to operation 902. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
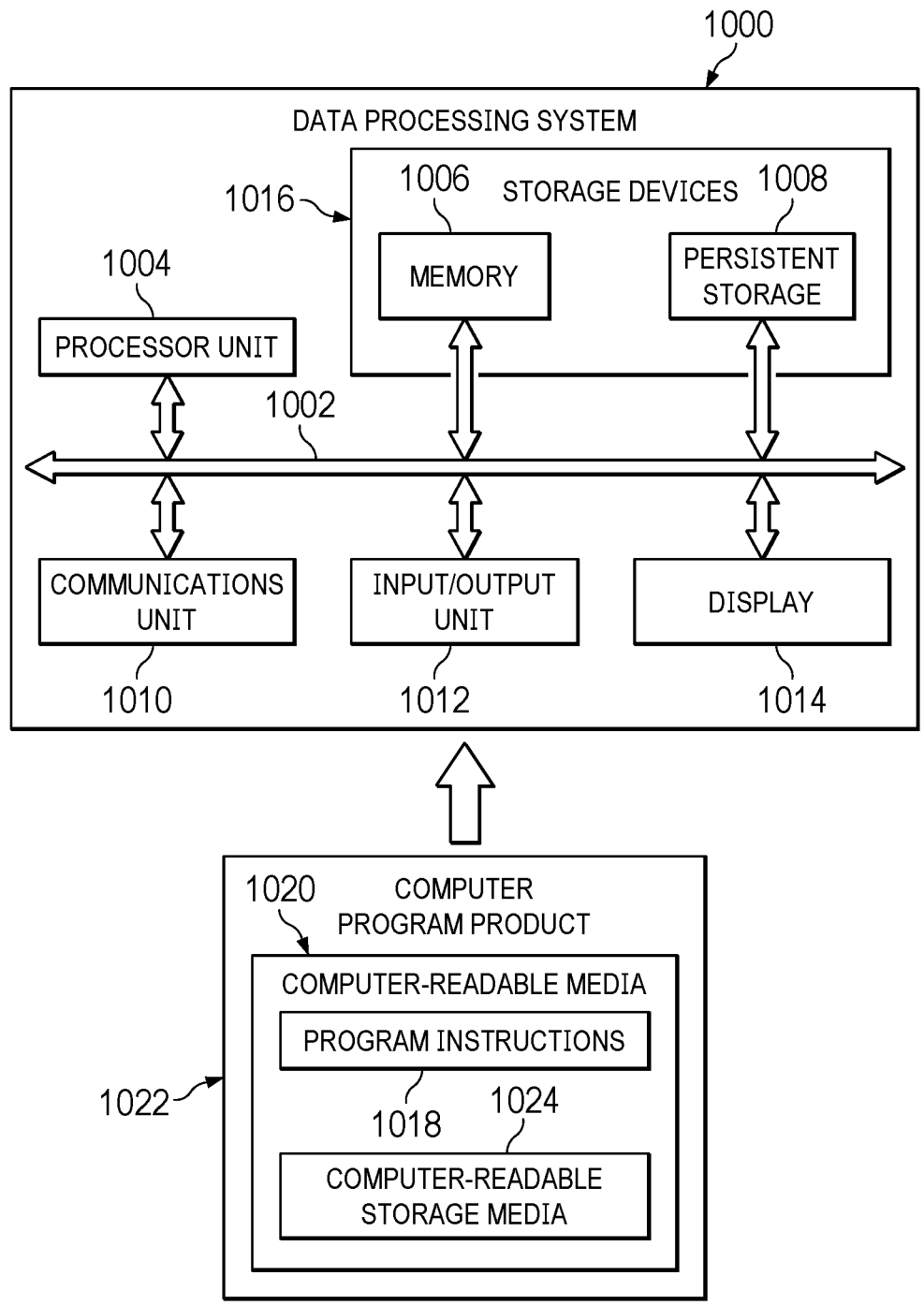
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 210 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 can take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 can provide a connection for user input through at least one of a keyboard, a mouse, or some other suitable input device. Further, input/output unit 1012 can send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which can be located in a memory, such as memory 1006.

These instructions are program instructions and are also referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program instructions 1018 are located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

Computer-readable storage media 1024 is a physical or tangible storage device used to store program instructions 1018 rather than a media that propagates or transmits program instructions 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer-readable signal media. The computer-readable signal media are signals and can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program instructions 1018 can be located in computer-readable media 1020 in the form of a single storage device or system. In another example, program instructions 1018 can be located in computer-readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer-readable media 1020 in a server computer while another portion of program instructions 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, can be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Figure 11:
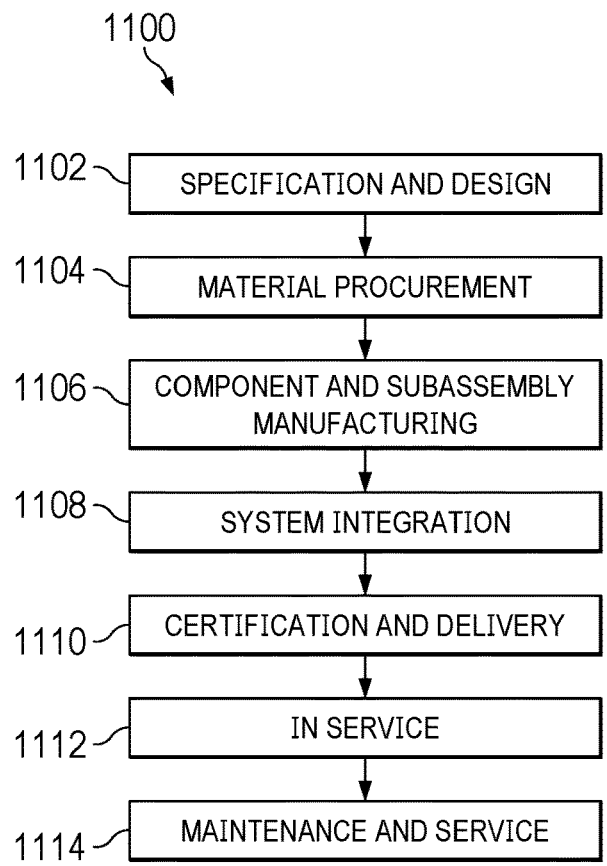
FIG. 11 is an illustration of an aircraft manufacturing and service method in accordance with an illustrative embodiment.
Figure 12:
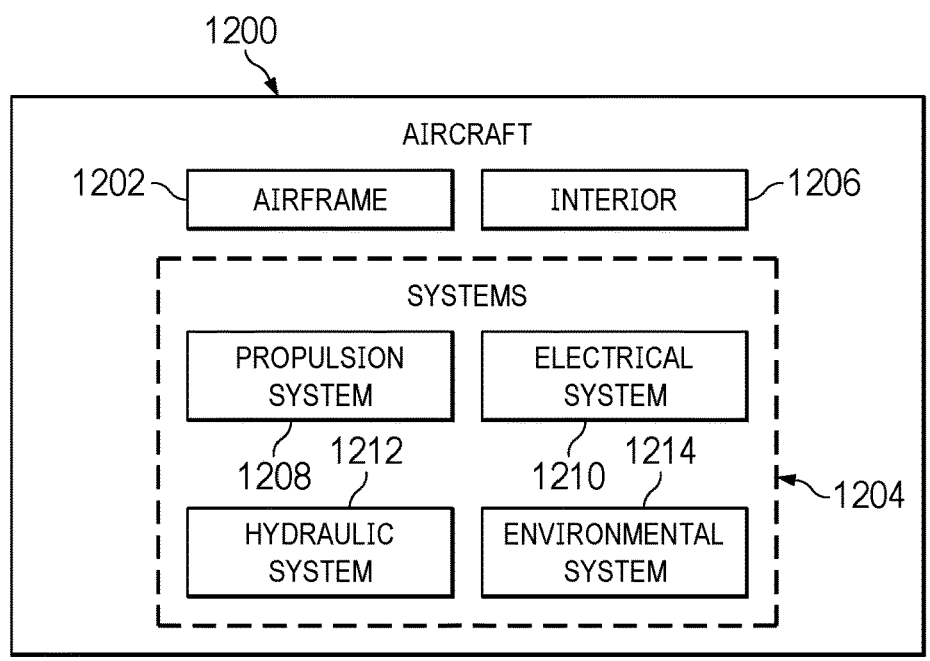
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 can go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 can be fabricated or manufactured in a manner similar to components or subassemblies produced while aircraft 1200 is in service 1112 in FIG. 11. As yet another example, one or more apparatus embodiments, method embodiments, or a combination thereof can be utilized during production stages, such as component and subassembly manufacturing 1106 and system integration 1108 in FIG. 11. One or more apparatus embodiments, method embodiments, or a combination thereof may be utilized while aircraft 1200 is in service 1112, during maintenance and service 1114 in FIG. 11, or both. The use of a number of the different illustrative embodiments may substantially expedite the assembly of aircraft 1200, reduce the cost of aircraft 1200, or both expedite the assembly of aircraft 1200 and reduce the cost of aircraft 1200.

For example, maintenance manager 212 in FIG. 2 can be used during in service 1112 and maintenance and service 1114 to predict when maintenance should be performed for aircraft 1200. Using machine learning models 218 to make predictions about components in a manner that provides knowledge of impending changes in component performance that result in undesired aircraft performance. With these predictions, components can be procured ahead of time and the allocation of resources for service and repair can be made more efficiently.

Figure 13:
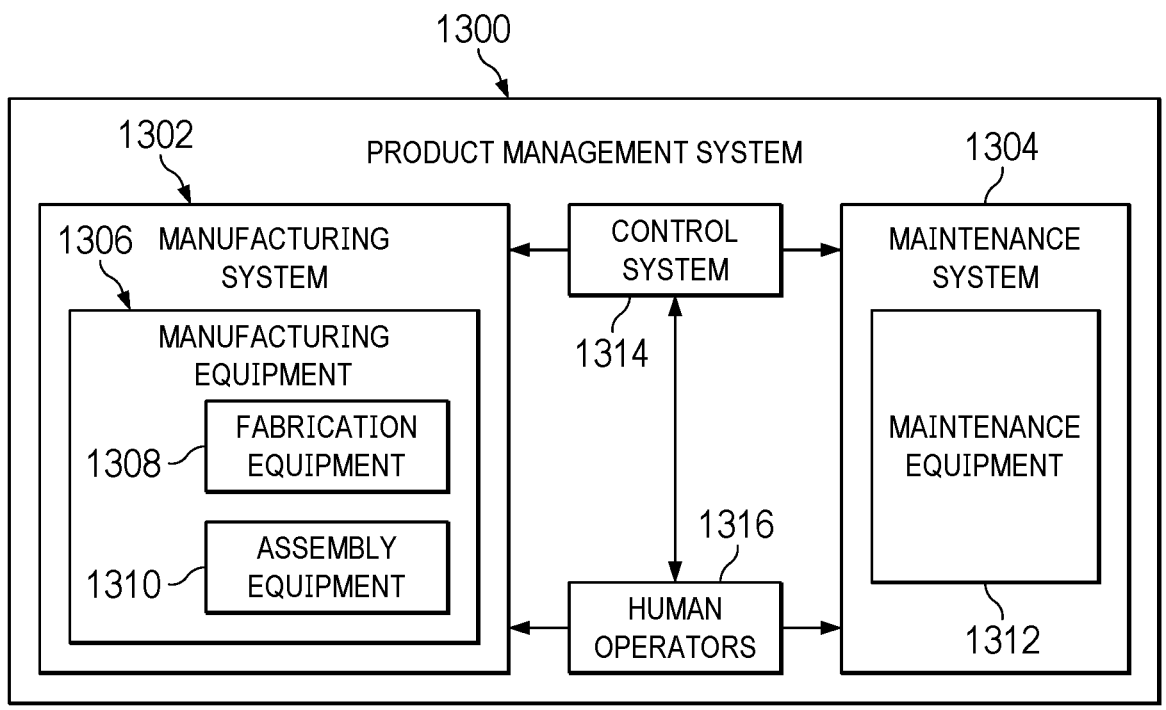
FIG. 13 is an illustration of a block diagram of a product management system is depicted in accordance with an illustrative embodiment.

Turning now to FIG. 13, an illustration of a block diagram of a product management system is depicted in accordance with an illustrative embodiment. Product management system 1300 is a physical hardware system. In this illustrative example, product management system 1300 includes at least one of manufacturing system 1302 or maintenance system 1304.

Manufacturing system 1302 is configured to manufacture products, such as aircraft 1200 in FIG. 12. As depicted, manufacturing system 1302 includes manufacturing equipment 1306. Manufacturing equipment 1306 includes at least one of fabrication equipment 1308 or assembly equipment 1310.

Fabrication equipment 1308 is equipment that used to fabricate components for parts used to form aircraft 1200 in FIG. 12. For example, fabrication equipment 1308 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 1308 can be used to fabricate at least one of metal parts, composite parts, semiconductors, circuits, fasteners, ribs, skin panels, spars, antennas, or other suitable types of parts.

Assembly equipment 1310 is equipment used to assemble parts to form aircraft 1200 in FIG. 12. In particular, assembly equipment 1310 is used to assemble components and parts to form aircraft 1200 in FIG. 12. Assembly equipment 1310 also can include machines and tools. These machines and tools may be at least one of a robotic arm, a crawler, a faster installation system, a rail-based drilling system, or a robot. Assembly equipment 1310 can be used to assemble parts such as seats, horizontal stabilizers, wings, engines, engine housings, landing gear systems, and other parts for aircraft 1200 in FIG. 12.

In this illustrative example, maintenance system 1304 includes maintenance equipment 1312. Maintenance equipment 1312 can include any equipment needed to perform maintenance on aircraft 1200 in FIG. 12. Maintenance equipment 1312 may include tools for performing different operations on parts on aircraft 1200 in FIG. 12. These operations can include at least one of disassembling parts, refurbishing parts, inspecting parts, reworking parts, manufacturing replacement parts, or other operations for performing maintenance on aircraft 1200 in FIG. 12. These operations can be for routine maintenance, inspections, upgrades, refurbishment, or other types of maintenance operations.

In the illustrative example, maintenance equipment 1312 may include ultrasonic inspection devices, x-ray imaging systems, vision systems, drills, crawlers, and other suitable devices. In some cases, maintenance equipment 1312 can include fabrication equipment 1308, assembly equipment 1310, or both to produce and assemble parts that needed for maintenance.

Product management system 1300 also includes control system 1314. Control system 1314 is a hardware system and may also include software or other types of components. Control system 1314 is configured to control the operation of at least one of manufacturing system 1302 or maintenance system 1304. In particular, control system 1314 can control the operation of at least one of fabrication equipment 1308, assembly equipment 1310, or maintenance equipment 1312.

The hardware in control system 1314 can be implemented using hardware that may include computers, circuits, networks, and other types of equipment. The control may take the form of direct control of manufacturing equipment 1306. For example, robots, computer-controlled machines, and other equipment can be controlled by control system 1314. In other illustrative examples, control system 1314 can manage operations performed by human operators 1316 in manufacturing or performing maintenance on aircraft 1200. For example, control system 1314 can assign tasks, provide instructions, display models, or perform other operations to manage operations performed by human operators 1316. In these illustrative examples, maintenance manager 134 from FIG. 1 can be implemented in control system 1314 to manage at least one of the manufacturing or maintenance of aircraft 1200 in FIG. 12.

In the different illustrative examples, human operators 1316 can operate or interact with at least one of manufacturing equipment 1306, maintenance equipment 1312, or control system 1314. This interaction can occur to manufacture aircraft 1200 in FIG. 12.

Of course, product management system 1300 may be configured to manage other products other than aircraft 1200 in FIG. 12. Although product management system 1300 has been described with respect to manufacturing in the aerospace industry, product management system 1300 can be configured to manage products for other industries. For example, product management system 1300 can be configured to manufacture products for the automotive industry as well as any other suitable industries.

Some features of the illustrative examples are described in the following clauses. These clauses are examples of features not intended to limit other illustrative examples.

Clause 1

A method for managing a maintenance for a component in a vehicle, the method comprising:

training behavior machine learning models using first training data to output predicted values for target parameters for a normal behavior of the component operating in a tolerance, wherein each behavior machine learning model in the behavior machine learning models predicts a target parameter in the target parameters for the component;

determining historical prediction metrics from the predicted values for the target parameters predicted by the behavior machine learning models in response to receiving historical sensor data and actual values for the target parameters for the component;

training a maintenance machine learning model using second training data to predict whether the maintenance is needed for the component, wherein the second training data comprises the historical prediction metrics determined for the target parameters, wherein the maintenance machine learning model outputs a prediction as to whether the component will become out of the tolerance after a time period; and determining whether the maintenance is needed for the component using sensor data for the component, prediction metrics determined from the predicted values for the target parameters output by the behavior machine learning models and the actual values for the target parameters, and the maintenance machine learning model.

Clause 2

The method according to clause 1, wherein the first training data for a behavior machine learning model in the behavior machine learning models comprises the historical sensor data that has been labeled with the actual values for the target parameters to be predicted by the behavior machine learning model, wherein each behavior machine learning model is trained to predict a different target parameter from other behavior machine learning models.

Clause 3

The method according to one of clauses 1 or 2, wherein the first training data is based on at least one of parameters, the target parameters, or features derived from the historical sensor data for the target parameters.

Clause 4

The method according to one of clauses 1, 2, or 3, wherein the second training data comprises the historical prediction metrics and labels indicating whether the component was out of the tolerance.

Clause 5

The method according to one of clauses 1, 2, 3, or 4, wherein determining whether the maintenance is needed for the component comprises:

sending sensor data for the component into the behavior machine learning models;

receiving the predicted values for the target parameters from the behavior machine learning models;

determining the prediction metrics from the predicted values for the target parameters output from the behavior machine learning model for the sensor data and the actual values for the target parameters in the sensor data;

sending the prediction metrics into the maintenance machine learning model; and receiving a prediction of whether the maintenance is needed for the component from the maintenance machine learning model.

Clause 6

The method according to one of clauses 1, 2, 3, 4, or 5, wherein the historical prediction metrics are selected from at least one of a prediction error, an absolute prediction error, a root mean square error, mean absolute error, or a goodness-of-fit for each target parameter in the target parameters.

Clause 7

The method according to one of clauses 1, 2, 3, 4, 5, or 6, wherein the behavior machine learning models are regression machine learning models and the maintenance machine learning model is a classification machine learning model.

Clause 8

The method according to one of clauses 1, 2, 3, 4, 5, 6, or 7, wherein the vehicle is an aircraft and predictions made using the behavior machine learning models and the maintenance machine learning model are for at least one of a phase of flight, a taxi out, a takeoff, a climb, a cruise, a descent, a landing, an entire flight of the aircraft, a mode of operation of the aircraft, of a target range of control condition for the aircraft.

Clause 9

The method according to one of clauses 1, 2, 3, 4, 5, 6, 7, or 8, wherein the component in a vehicle is selected from a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

Clause 10

A method for managing a maintenance for a component in a vehicle, the method comprising:

receiving sensor data for the vehicle;

predicting target parameters using behavior machine learning models trained using first training data to predict the target parameters for a normal behavior of the component operating in a tolerance, wherein the target parameters characterize behavior of the component;

determining prediction metrics from predicted values for the target parameters predicted by behavior machine learning models and actual values for the target parameters; and predicting whether the component will fall out of the tolerance after a time period using the prediction metrics and a maintenance machine learning model trained using second training data to predict whether the maintenance is needed for the component, wherein the second training data comprises historical prediction metrics determined for the target parameters.

Clause 11

A vehicle management system comprising:

a computer system; and a maintenance manager in the computer system, wherein the maintenance manager is configured to:

train behavior machine learning models using first training data to output predicted values for target parameters for a normal behavior of a component operating in a tolerance, wherein each behavior machine learning model in the behavior machine learning models predicts a target parameter in the target parameters for the component;

determine historical prediction metrics from the predicted values for the target parameters predicted by behavior machine learning models in response to receiving historical sensor data and actual values for the target parameters for the component;

train a maintenance machine learning model using second training data to predict whether a maintenance is needed for the component, wherein the second training data comprises the historical prediction metrics determined for the target parameters, wherein the maintenance machine learning model outputs a prediction as to whether the component will become out of the tolerance after a time period; and determine whether the maintenance is needed for the component using sensor data for the component, prediction metrics determined from the predicted values for the target parameters output by the behavior machine learning models and the actual values for the target parameters, and the maintenance machine learning model.

Clause 12

The vehicle management system according to clause 11, wherein the first training data for a behavior machine learning model in the behavior machine learning models comprises the historical sensor data that has been labeled with the actual values for the target parameters to be predicted by the behavior machine learning model, wherein each behavior machine learning model is trained to predict a different target parameter from other behavior machine learning models.

Clause 13

The vehicle management system according to one of clauses 11 or 12, wherein the first training data comprises at least one of parameters, the target parameters, or features derived from the historical sensor data for the target parameters.

Clause 14

The vehicle management system according to one of clauses 11, 12, or 13, wherein the second training data comprises the prediction metrics and labels indicating whether the component was out of the tolerance.

Clause 15

The vehicle management system according to one of clauses 11, 12, 13, or 14, wherein determining whether the maintenance is needed for the component, the maintenance manager is configured to:
  send sensor data for the component into the behavior machine learning models;
  receive the predicted values for the target parameters from the behavior machine learning models;
  determine the prediction metrics from the predicted values for the target parameters output from the behavior machine learning model for the sensor data and the actual values for the target parameters in the sensor data;
  send the prediction metrics into the maintenance machine learning model; and
  receive a prediction of whether the maintenance is needed for the component from the maintenance machine learning model.

Clause 16

The vehicle management system according to one of clauses 11, 12, 13, 14, or 15, wherein the prediction metrics are selected from at least one of a prediction error, an absolute prediction error, a root mean square error, mean absolute error, or a goodness-of-fit for each target parameter in the target parameters.

Clause 17

The vehicle management system according to one of clauses 11, 12, 13, 14, 15, or 16, wherein the behavior machine learning models are regression machine learning models and the maintenance machine learning model is a classification machine learning model.

Clause 18

The vehicle management system according to one of clauses 11, 12, 13, 14, 15, 16, or 17, wherein a vehicle is an aircraft and predictions made for using the behavior machine learning models and the maintenance machine learning model are for at least one of a phase of flight, a taxi out, a takeoff, a climb, a cruise, a descent, a landing, or an entire flight of the aircraft.

Clause 19

The vehicle management system according to one of clauses 11, 12, 13, 14, 15, 16, 17, or 18, wherein the component in a vehicle is selected from a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

Clause 20

A vehicle management system comprising:
  a computer system; and
  a maintenance manager in the computer system, wherein the maintenance manager is configured to:
  receive sensor data for a vehicle;
  predict target parameters using behavior machine learning models trained using first training data to predict the target parameters for a normal behavior of a component operating in a tolerance, wherein the target parameters characterize behavior of the component;
  determine prediction metrics from predicted values for the target parameters predicted by the behavior machine learning models and actual values for the target parameters; and
  predict whether the component will fall out of the tolerance after a time period using the prediction metrics and a maintenance machine learning model trained using second training data to predict whether a maintenance is needed for the component, wherein the second training data comprises historical prediction metrics determined for the target parameters and the actual values for the target parameters.

Illustrative examples provide a method, apparatus, system, and computer program product for managing maintenance of components. In the illustrative examples, a maintenance manager can train behavior machine learning models using first training data to predict target parameters. The first training data can comprise historical sensor data labeled with actual values for target parameters.

The target parameters predicted can be used to train a maintenance machine learning model. In this illustrative example, the predicted target parameters can be used to determine prediction metrics that form training data. The second training data is used to train a machine learning model to predict when the component will fall out of tolerance.

In this illustrative example, sensor data from a use of a vehicle can be input into the behavior machine learning models trained using the first training data. In response, these behavior machine learning models output predictions of the target parameters. These predictions can be used to determine prediction metrics which are then sent into the maintenance machine learning model as an input. In response, the maintenance machine learning model outputs the prediction of when component will fall out of tolerance. For example, the prediction can be whether the component will fall out of tolerance in the next five days.

Thus, illustrative example provides a multistage data-driven approach to generate predictions for use in performing maintenance on a vehicle such as aircraft. The illustrative examples can handle large amounts of data and reduce the amount of data processed based on at least one of a selective target parameters for features derived from parameters. As result, with the selection of at least one of target parameters or feature creation, the use of processor resources can be reduced while increasing the amount of data that is used for training.

Further, the use of prediction metrics can be used to consider different error statistics for different conditions, such as phase of flight, environmental conditions, or other conditions.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a maintenance for a component in a vehicle, the method comprising:
    training behavior machine learning models using first training data to output predicted values for target parameters for a normal behavior of the component operating in a tolerance, wherein the first training data comprises historical sensor data labeled with actual values for the target parameters to be predicted by the behavior machine learning models, wherein each behavior machine learning model in the behavior machine learning models predicts a target parameter in the target parameters for the component;
    determining historical prediction metrics from the predicted values for the target parameters predicted by the behavior machine learning models in response to receiving the historical sensor data and actual values for the target parameters for the component;
    training a maintenance machine learning model using second training data to predict whether the maintenance is needed for the component, wherein the second training data comprises the historical prediction metrics, wherein the maintenance machine learning model outputs a prediction as to whether the component will become out of the tolerance after a time period; and
    determining whether the maintenance is needed for the component using new sensor data for the component, prediction metrics derived from the new sensor data for the component and the maintenance machine learning model.

2. The method of claim 1, wherein each behavior machine learning model is trained to predict a different target parameter from other behavior machine learning models.

3. The method of claim 1, wherein the first training data is based on at least one of parameters, the target parameters, or features derived from the historical sensor data for the target parameters.

4. The method of claim 1, wherein determining whether the maintenance is needed for the component comprises:
    sending the new sensor data for the component into the behavior machine learning models;
    receiving the predicted values for the target parameters from the behavior machine learning models;
    determining the prediction metrics from the predicted values for the target parameters output from the behavior machine learning model for the sensor data and the actual values for the target parameters in the sensor data;
    sending the prediction metrics into the maintenance machine learning model; and
    receiving a prediction of whether the maintenance is needed for the component from the maintenance machine learning model.

5. The method of claim 1, wherein the historical prediction metrics are selected from at least one of a prediction error, an absolute prediction error, a root mean square error, mean absolute error, or a goodness-of-fit for each target parameter in the target parameters.

6. The method of claim 1, wherein the behavior machine learning models are regression machine learning models and the maintenance machine learning model is a classification machine learning model.

7. The method of claim 1, wherein the vehicle is an aircraft and predictions made using the behavior machine learning models and the maintenance machine learning model are for at least one of a phase of flight, a taxi out, a takeoff, a climb, a cruise, a descent, a landing, an entire flight of the aircraft, a mode of operation of the aircraft, of a target range of control condition for the aircraft.

8. The method of claim 1, wherein the component in a vehicle is selected from a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

9. A vehicle management system comprising:
    a computer system; and
    a maintenance manager in the computer system, wherein the maintenance manager is configured to:
    train behavior machine learning models using first training data to output predicted values for target parameters for a normal behavior of a component operating in a tolerance, wherein the first training data comprises historical sensor data labeled with actual values for the target parameters to be predicted by the behavior machine learning models, wherein each behavior machine learning model in the behavior machine learning models predicts a target parameter in the target parameters for the component;
    determine historical prediction metrics from the predicted values for the target parameters predicted by the behavior machine learning models in response to receiving the historical sensor data and actual values for the target parameters for the component;
    train a maintenance machine learning model using second training data to predict whether a maintenance is needed for the component, wherein the second training data comprises the historical prediction metrics determined for the target parameters, wherein the maintenance machine learning model outputs a prediction as to whether the component will become out of the tolerance after a time period; and
    determine whether the maintenance is needed for the component using new sensor data for the component, prediction metrics derived from the new sensor data and the maintenance machine learning model.

10. The vehicle management system of claim 9, wherein each behavior machine learning model is trained to predict a different target parameter from other behavior machine learning models.

11. The vehicle management system of claim 9, wherein the first training data comprises at least one of parameters, the target parameters, or features derived from the historical sensor data for the target parameters.

12. The vehicle management system of claim 9, wherein determining whether the maintenance is needed for the component, the maintenance manager is configured to:
   send sensor data for the component into the behavior machine learning models;
   receive the predicted values for the target parameters from the behavior machine learning models;
   determine the prediction metrics from the predicted values for the target parameters output from the behavior machine learning model for the sensor data and the actual values for the target parameters in the sensor data;
   send the prediction metrics into the maintenance machine learning model; and
   receive a prediction of whether the maintenance is needed for the component from the maintenance machine learning model.

13. The vehicle management system of claim 9, wherein the prediction metrics are selected from at least one of a prediction error, an absolute prediction error, a root mean square error, mean absolute error, or a goodness-of-fit for each target parameter in the target parameters.

14. The vehicle management system of claim 9, wherein the behavior machine learning models are regression machine learning models and the maintenance machine learning model is a classification machine learning model.

15. The vehicle management system of claim 9, wherein a vehicle is an aircraft and predictions made for using the behavior machine learning models and the maintenance machine learning model are for at least one of a phase of flight, a taxi out, a takeoff, a climb, a cruise, a descent, a landing, or an entire flight of the aircraft.

16. The vehicle management system of claim 9, wherein the component in a vehicle is selected from a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

17. A computer program product comprising a non-transitory computer readable storage medium having program instructions embodied therewith, the program instructions executable by a computer to cause the computer to:
   train behavior machine learning models using first training data to output predicted values for target parameters for a normal behavior of a component operating in a tolerance, wherein the first training data comprises historical sensor data labeled with actual values for the target parameters to be predicted by the behavior machine learning models, wherein each behavior machine learning model in the behavior machine learning models predicts a target parameter in the target parameters for the component;
   determine historical prediction metrics from the predicted values for the target parameters predicted by the behavior machine learning models in response to receiving the historical sensor data and actual values for the target parameters for the component;
   train a maintenance machine learning model using second training data to predict whether maintenance is needed for the component, wherein the second training data comprises the historical prediction metrics determined for the target parameters, wherein the maintenance machine learning model outputs a prediction as to whether the component will become out of the tolerance after a time period; and
   determine whether the maintenance is needed for the component using new sensor data for the component, prediction metrics derived from the new sensor data and the maintenance machine learning model.

18. The computer program product of claim 17, wherein each behavior machine learning model is trained to predict a different target parameter from other behavior machine learning models.

19. The computer program product of claim 17, wherein the first training data is based on at least one of parameters, the target parameters, or features derived from the historical sensor data for the target parameters.

20. The computer program product of claim 17, wherein the historical prediction metrics are selected from at least one of a prediction error, an absolute prediction error, a root mean square error, mean absolute error, or a goodness-of-fit for each target parameter in the target parameters.

21. The computer program product of claim 17, wherein the behavior machine learning models are regression machine learning models and the maintenance machine learning model is a classification machine learning model.

* * * * *